July 14, 1936.  F. SIPOS  2,047,295
COTTER PIN
Filed March 22, 1935
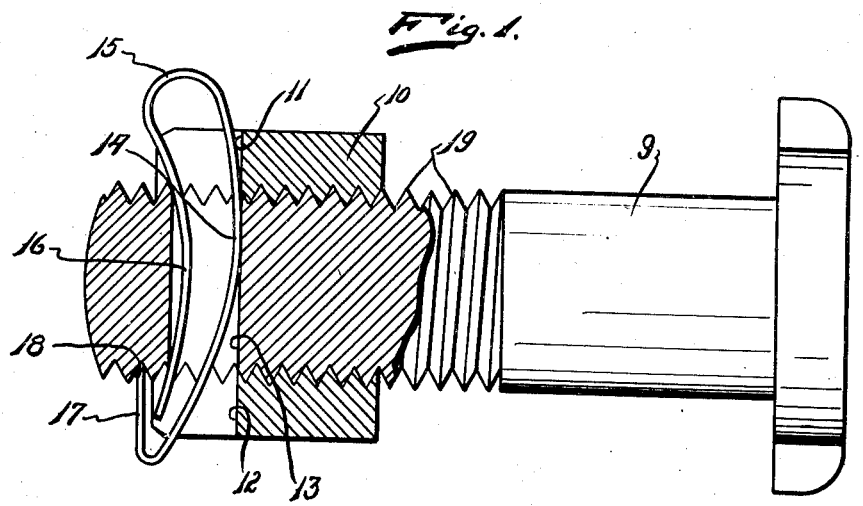
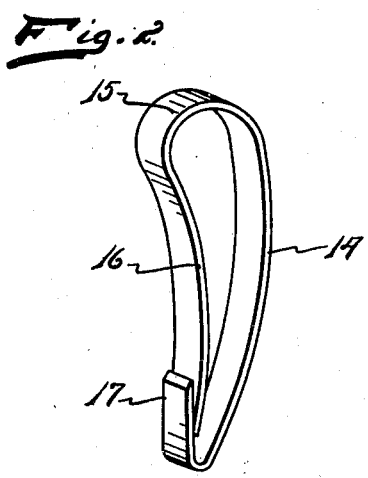
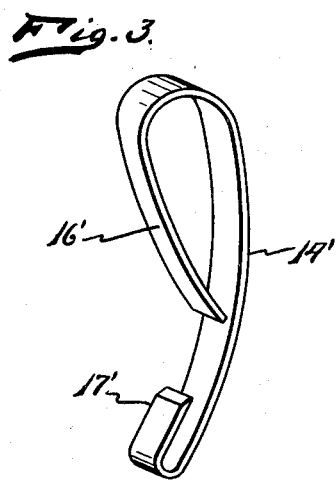
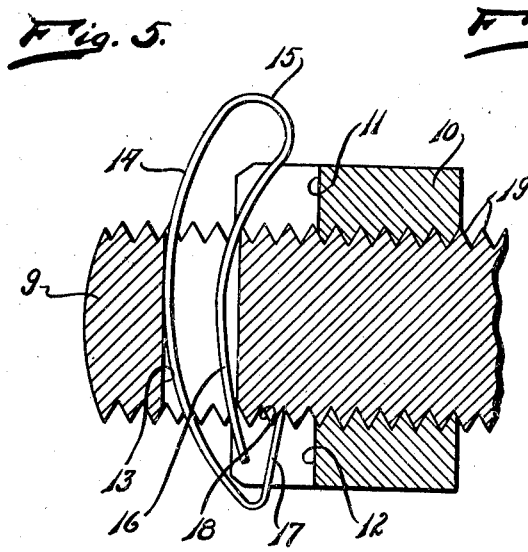
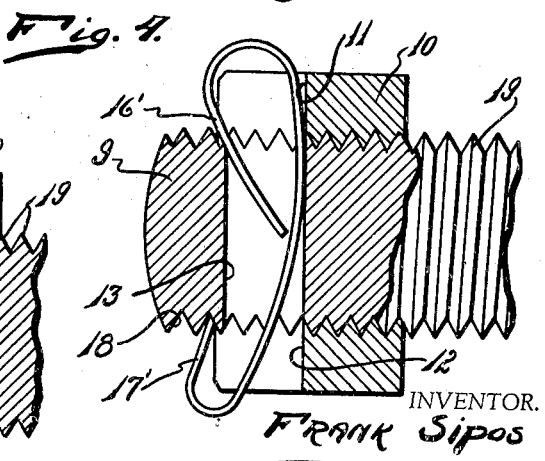
INVENTOR.
FRANK Sipos
BY
ATTORNEY.

Patented July 14, 1936

2,047,295

UNITED STATES PATENT OFFICE 2,047,295

COTTER PIN

Frank Sipos, Detroit, Mich.

Application March 22, 1935, Serial No. 12,446

7 Claims. (Cl. 85—8.5)

My invention relates to a new and useful improvement in a cotter pin of a type which is adapted to project through an opening or a notch formed in a nut and through a passageway formed in the bolt so as to prevent an unthreading of the nut on the bolt while in use.

It is an object of the present invention to provide a cotter pin so arranged and constructed that rattling while in use will be prevented.

Another object of the invention is the provision of a cotter pin so arranged and constructed that it will automatically lock itself in position so that the thrusting of the cotter pin through the passageway in the bolt and the locking of the cotter pin in position thereon is performed in a single operation.

Another object of the invention is the provision of a cotter pin of this class in which a considerable saving of time may be effected in placing the cotter pin in position and removing it, over that required with the present well known type of cotter pin.

Another object of the invention is the provision of a cotter pin so constructed that it may be economically manufactured, durable during use, light in weight, possessed of no projecting ends when in use, formed from a single piece of metal so constructed that it will not tangle in bunches and that it will not scratch the hands or tear the clothes of the operator when working in such places where cotter pins are used.

Other objects will appear hereinafter.

The invention consists in the combination and arrangement of parts hereinafter described and claimed.

The invention will be best understood by a reference to the accompanying drawing which forms a part of this specification, and in which, Fig. 1 is a side elevational view of a bolt showing the invention in position with a part of the bolt broken away and a part in section.

Fig. 2 is a perspective view of the invention.

Fig. 3 is a perspective view of a modified form of the invention.

Fig. 4 illustrates the form shown in Fig. 3 mounted in position in use.

Fig. 5 illustrates the form shown in Fig. 1 faced opposite to the direction of facing shown in Fig. 1.

In Fig. 1, I have illustrated a bolt 9 having a nut 10 threaded thereon. This nut is provided with the diametrically opposite recesses 11 and 12 and the bolt is provided with the passage 13 formed therethrough. Mounted in this bolt I have shown one form of the cotter pin. As shown in Fig. 2 this cotter pin is formed from a single strip of resilient material and is doubled upon itself to provide a loop. One side 14 of the loop is struck on a curve extending from end to end. This side 14 terminates in the curved end portion 15, which is substantially semi-circular, so as to bring the end 16 inwardly toward the portion 14, and this portion 16 through the major portion of its length is curved to conform to the curvature of the portion 14. The portion 14 is provided on its end with the inturned tongue 17, which is adapted to over-lie and engage the end of the portion 16. The cotter pin must be of such size that the loop will be larger than the passageway 13, through which it is projected so that as the cotter pin is thrust into position the portion 16 will approach the portion 14 so as to open the loop and permit the tongue 17, after it has projected through the opening or passage 13, to spring upwardly and snap into engagement with the bolt in one of the spaces 18 between the threads 19. It is thus obvious that the cotter pin automatically locks itself in position on the bolt as it is used, so that further operation on the device, after it has been thrust through the opening is unnecessary. In order to secure the pin in position when thrust into position a strain is placed on the portion 14, tending to straighten it, and this strain remains to a considerable degree after the tongue 17 has snapped into the position shown in Fig. 1. If the device were to be permitted to spring into normal position the portion 16 would snap into engagement with the under surface by the tongue 17 so that it is obvious from an examination of Fig. 1 that the device is under tension. It will be noted that with a cotter pin of this type, the use of a hammer or chisel for bending the ends is obviated and a durable, nonrattling device is provided.

In the form shown in Fig. 3 the portion 14' resembles in contour, the portion 14 shown in Fig. 2, but the tongue 17' is bent upon the portion 14' more than is the tongue 17 on the portion 14. The portion 16' serves as an abutment to engage the end of the opening formed through the bolt the end of the opening formed through the bolt, and the tongue 17 will snap into engagement with the threads of the bolt as clearly shown in Fig. 4. Due to the bending of the portion 14' the tongue 17' withdraws from the member 14'.

In Fig. 5, I have shown the same form of device illustrated in Fig. 1, but faced opposite on the bolt to the direction it is faced in Fig. 1.

From this description it is believed that all of the advantages numbered are accomplished and a light, strong, durable, and economical cotter pin, which is automatic in its operation is thus provided.

While I have illustrated and described the preferred forms of construction I do not wish to limit myself to the precise details of structure shown but desire to avail myself of such variations and modifications as come within the scope of the appended claims.

Having thus described my invention what I claim as new and desire to secure by Letters Patent is:

1. A cotter pin of the class described, comprising: a strip of resilient material doubled upon itself to provide a loop, both sides of said loop being struck on an arc and flexed in the same direction to lie concentric of each other; and a tongue formed on one end of said strip and extending inwardly toward the other end.

2. A cotter pin of the class described, comprising: a strip of resilient material doubled upon itself to provide a loop, both sides of said loop being struck on an arc and flexed in the same direction to lie concentric of each other; and a tongue formed on one end of said strip and extending inwardly toward the other end and projecting beyond the same so as to overlie it.

3. A cotter pin of the class described, comprising: a strip of resilient material doubled upon itself to provide a loop, both sides of said loop being struck on an arc and flexed in the same direction to lie concentric of each other; and a tongue formed on one end of said strip and extending inwardly toward the other end and projecting beyond it so as to overlie and normally rest in engagement with it.

4. A cotter pin of the class described, comprising: an elongated curved resilient body; and an engaging tongue on one end of said body bent inwardly toward the inner side of the curve and normally spaced from said body.

5. A cotter pin, comprising: a strip of resilient material doubled upon itself to provide a pair of curved sides; and a tongue formed on the end of one of said sides and bent inwardly toward the inner side of the curve of said side.

6. A cotter pin, comprising: a strip of resilient material doubled upon itself to provide a pair of curved sides; and a tongue formed on the end of one of said sides and bent inwardly toward the inner side of the curve of said end and overlying the end of the other side.

7. A cotter pin comprising: a strip of resilient material doubled upon itself to provide a loop; a hook formed on one end of one side of said loop and turned inwardly toward the other side, said sides diverging from each other proceeding away from said hook.

FRANK SIPOS.